(12) United States Patent
Rofougaran

(10) Patent No.: US 7,623,830 B2
(45) Date of Patent: Nov. 24, 2009

(54) AUTO-CALIBRATING RECEIVER AND METHODS FOR USE THEREWITH

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 513 days.

(21) Appl. No.: 11/710,824

(22) Filed: Feb. 26, 2007

(65) Prior Publication Data

US 2008/0207240 A1 Aug. 28, 2008

(51) Int. Cl.
*H04B 7/00* (2006.01)
(52) U.S. Cl. ...................... 455/73; 455/234.1
(58) Field of Classification Search .......... None
See application file for complete search history.

(56) References Cited

U.S. PATENT DOCUMENTS 5,937,336 A * 8/1999 Kumagai .................. 455/126
2005/0152487 A1 * 7/2005 Reichard .................. 375/350
2008/0146181 A1 * 6/2008 Mason et al. .............. 455/234.1

* cited by examiner

*Primary Examiner*—Thanh C Le
(74) *Attorney, Agent, or Firm*—Garlick Harrison & Markison; Bruce E. Stuckman

(57) ABSTRACT

A voice, data and RF integrated circuit includes a processing module that generates at least one control signal that indicates a receive calibration mode. An RF transmitter generates a transmit signal that includes a first calibration signal when the at least one control signal indicates the receive calibration mode. An RF receiver receives a received signal that includes the first calibration signal and generates at least one receiver equalization parameter for equalizing the RF receiver in response to receiver feedback signals, when the at least one control signal indicates the receive calibration mode.

27 Claims, 13 Drawing Sheets

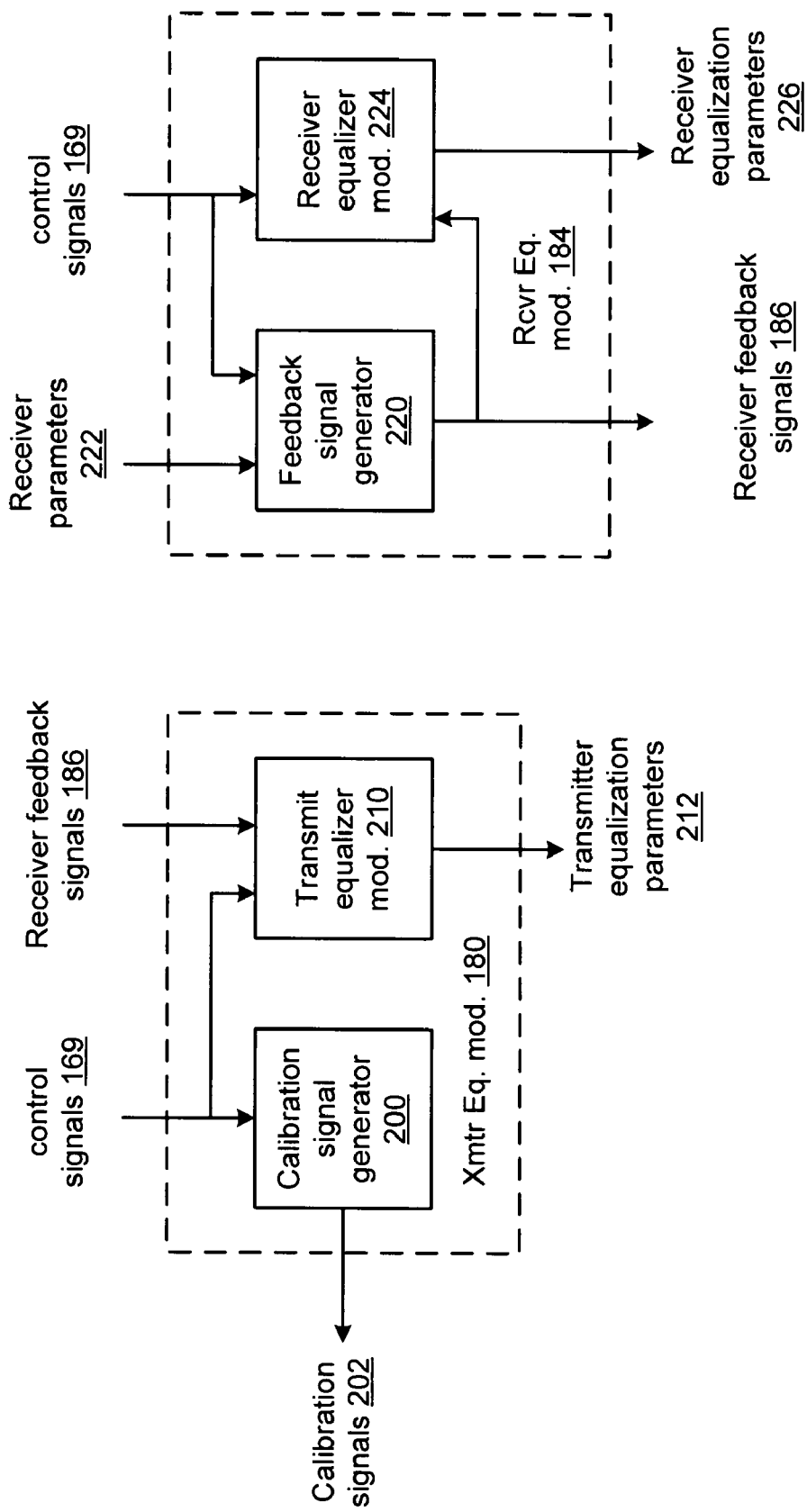

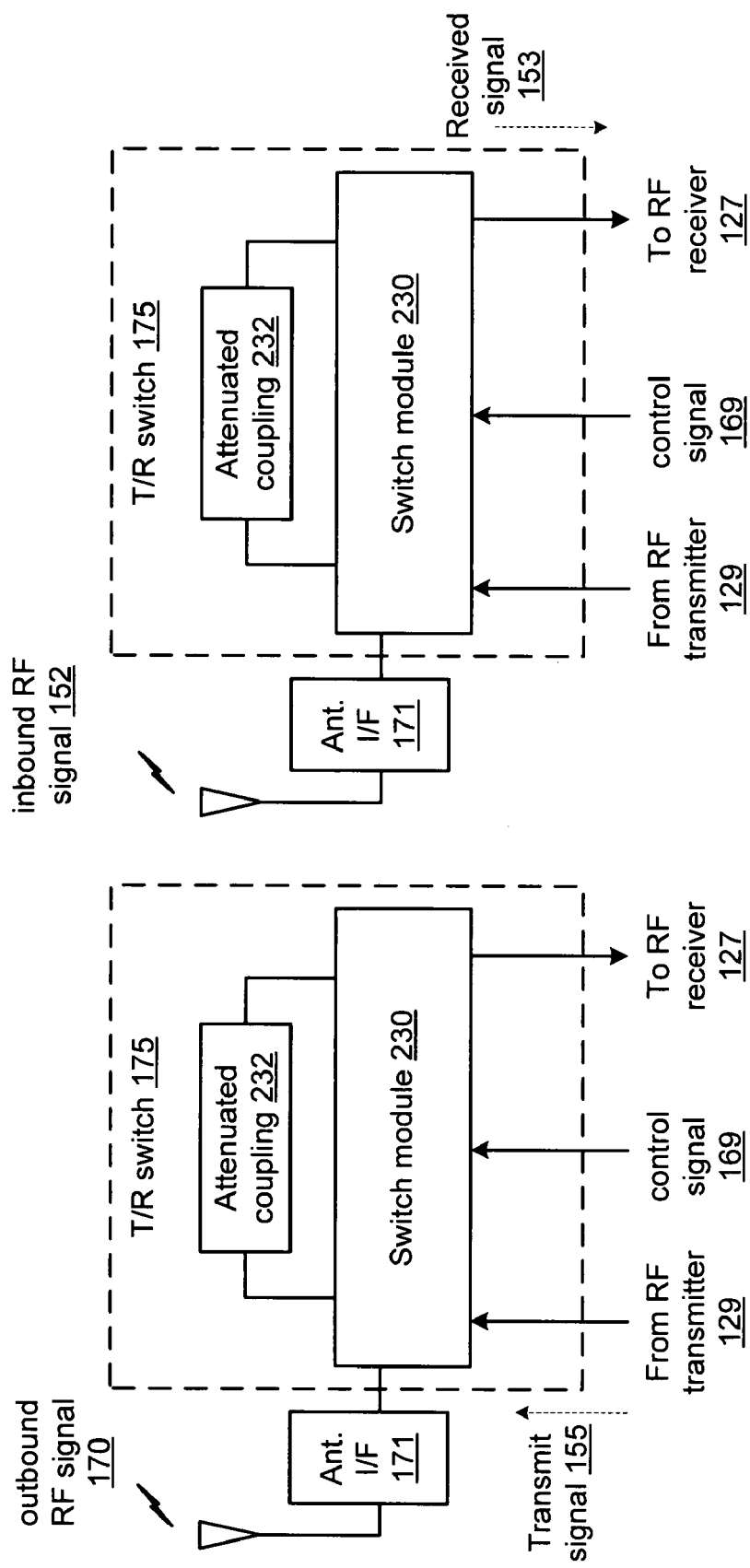

AUTO-CALIBRATING RECEIVER AND METHODS FOR USE THEREWITH

CROSS-REFERENCE TO RELATED APPLICATIONS

Not applicable

BACKGROUND OF THE INVENTION

1. Technical Field of the Invention

This invention relates generally to wireless communications systems and more particularly to radio transceivers used within such wireless communication systems.

2. Description of Related Art

Communication systems are known to support wireless and wire line communications between wireless and/or wire line communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna through an antenna interface and includes a low noise amplifier, one or more intermediate frequency stages, a filtering stage, and a data recovery stage. The low noise amplifier (LNA) receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

Calibration of both receivers and transmitters can be an issue. Phase, frequency timing or gain errors can adversely affect the performance of receivers and transmitters. Calibration of these devices during assembly can be time consuming, costly and not reflect the actual operating conditions of these devices when they are installed. Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 6 is a schematic block diagram of a transmitter equalization module 180 in accordance with an embodiment of the present invention.

FIG. 7 is a schematic block diagram of a receiver equalization module 184 in accordance with an embodiment of the present invention.

FIG. 9 is a schematic block diagram of a transmit/receive switch 175 in a transmit mode in accordance with a further embodiment of the present invention.

FIG. 10 is a schematic block diagram of a transmit/receive switch 175 in a receive mode in accordance with a further embodiment of the present invention.

DETAILED DESCRIPTION OF THE INVENTION

Figure 1:
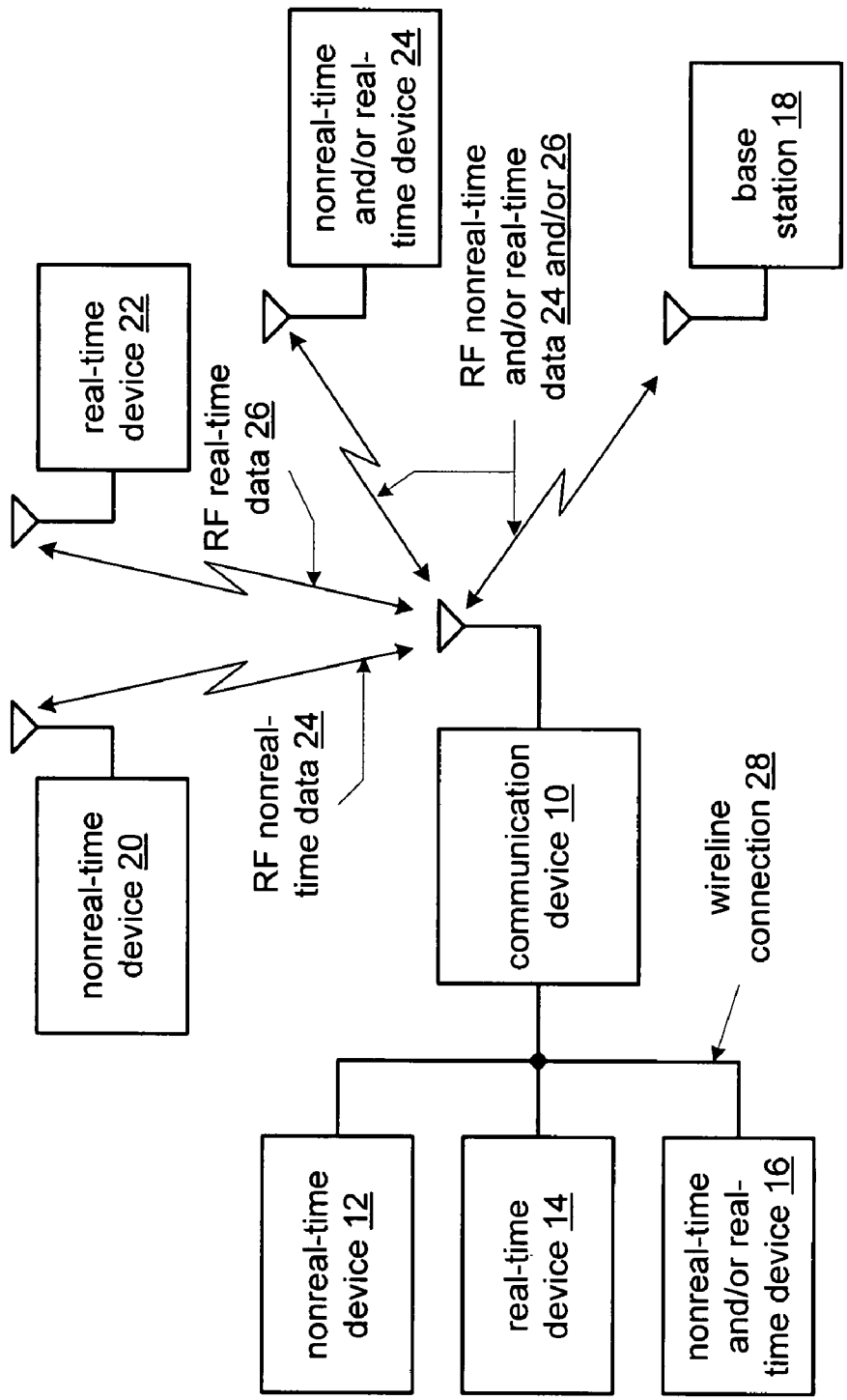
FIG. 1 is a schematic block diagram of a wireless communication system in accordance with the present invention.

FIG. 1 is a schematic block diagram of an embodiment of a communication system in accordance with the present invention. In particular a communication system is shown that includes a communication device 10 that communicates real-time data 24 and/or non-real-time data 26 wirelessly with one or more other devices such as base station 18, non-real-time device 20, real-time device 22, and non-real-time and/or real-time device 24. In addition, communication device 10 can also optionally communicate over a wireline connection with non-real-time device 12, real-time device 14 and non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game console, personal computer, laptop computer, or other device that performs one or more functions that include communication of voice and/or data via wireline connection 28 and/or the wireless communication path. In an embodiment of the present invention, the real-time and non-real-time devices 12, 14 16, 18, 20, 22 and 24 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 includes an integrated circuit, such as a combined voice, data and RF integrated circuit that includes one or more features or functions of the present invention. Such integrated circuits shall be described in greater detail in association with FIGS. 3-15 that follow.

Figure 2:
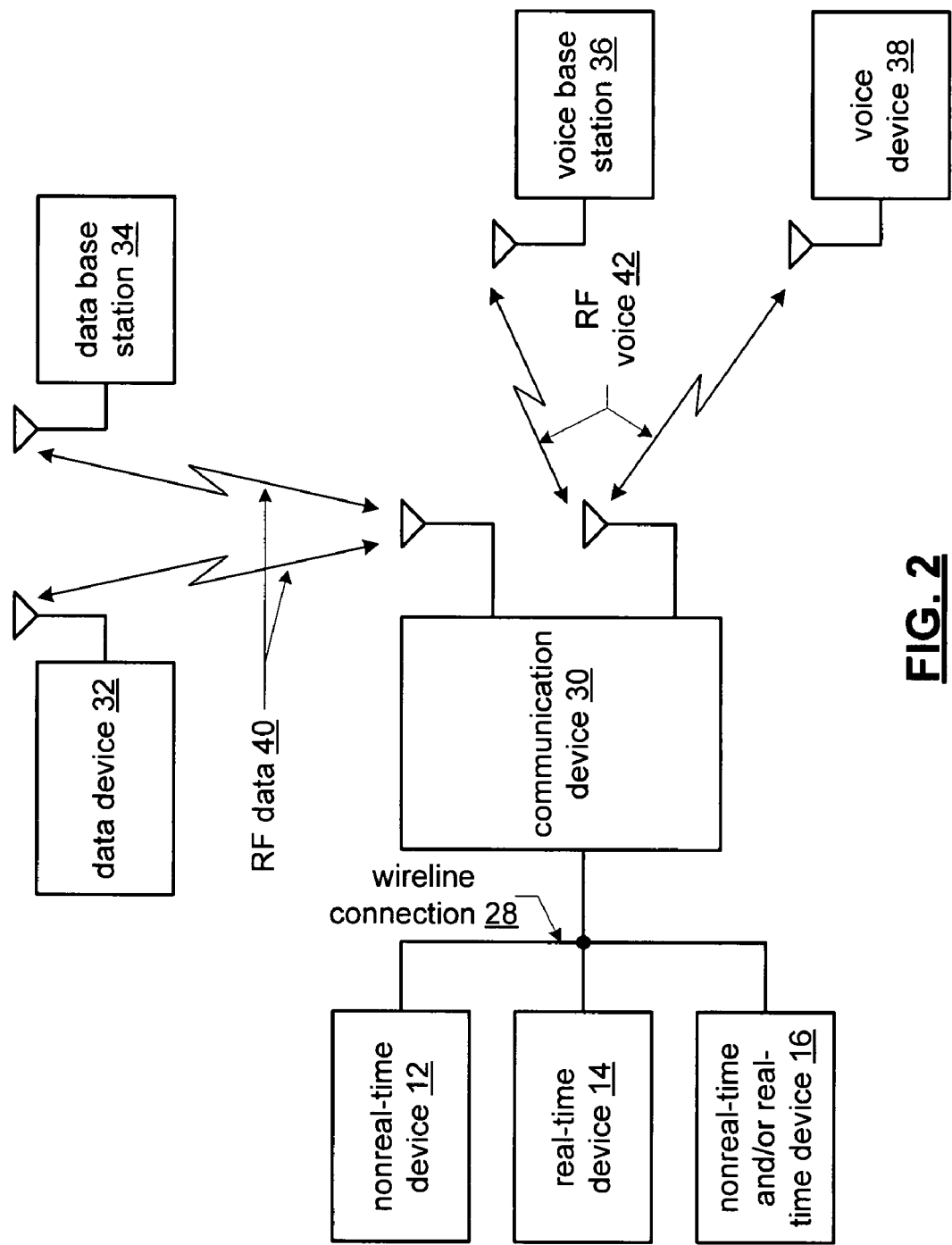
FIG. 2 is a schematic block diagram of a wireless communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes two separate wireless transceivers for communicating, contemporaneously, via two or more wireless communication protocols with data device 32 and/or data base station 34 via RF data 40 and voice base station 36 and/or voice device 38 via RF voice signals 42.

Figure 3:
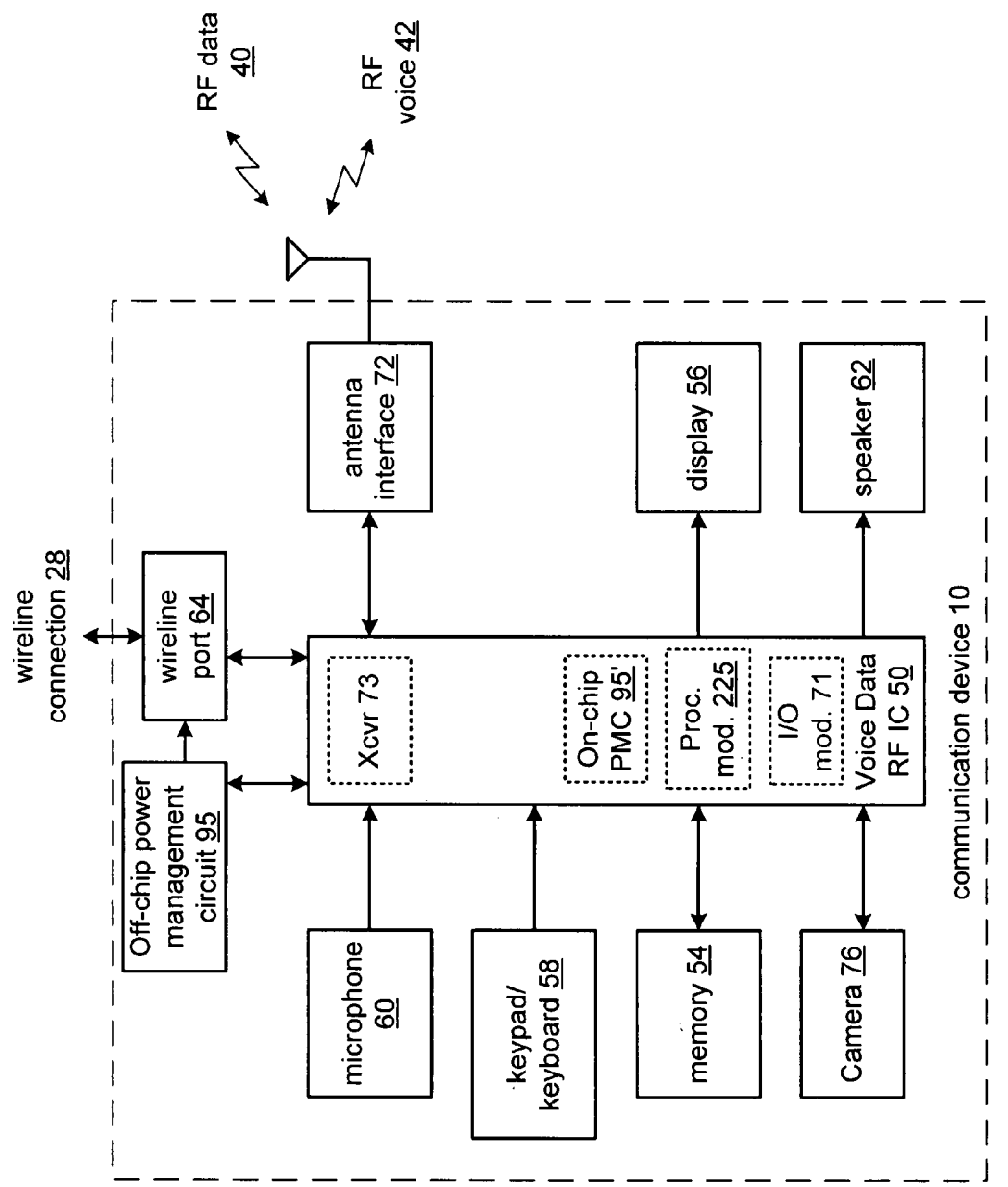
FIG. 3 is a schematic block diagram of a wireless communication device 10 in accordance with the present invention.

FIG. 3 is a schematic block diagram of an embodiment of an integrated circuit in accordance with the present invention. In particular, a voice data RF integrated circuit (IC) 50 is shown that implements communication device 10 in conjunction with microphone 60, keypad/keyboard 58, memory 54, speaker 62, display 56, camera 76, antenna interface 52 and wireline port 64. In addition, voice data RF IC 50 includes a transceiver 73 with RF and baseband modules for formatting and modulating data into RF real-time data 26 and non-real-time data 24 and transmitting this data via an antenna interface 72 and antenna. Further, voice data RF IC 50 includes an input/output module 71 with appropriate encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices.

Off-chip power management circuit 95 includes one or more DC-DC converters, voltage regulators, current regulators or other power supplies for supplying the voice data RF IC 50 and optionally the other components of communication device 10 and/or its peripheral devices with supply voltages and or currents (collectively power supply signals) that may be required to power these devices. Off-chip power management circuit 95 can operate from one or more batteries, line power and/or from other power sources, not shown. In particular, off-chip power management module can selectively supply power supply signals of different voltages, currents or current limits or with adjustable voltages, currents or current limits in response to power mode signals received from the voice data RF IC 50. Voice Data RF IC 50 optionally includes an on-chip power management circuit 95' for replacing the off-chip power management circuit 95.

In an embodiment of the present invention, the voice data RF IC 50 is a system on a chip integrated circuit that includes at least one processing device. Such a processing device, for instance, processing module 225, may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the Voice Data RF IC 50 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

In operation, the voice data RF IC 50 executes operational instructions that implement one or more of the applications (real-time or non-real-time) attributed to communication devices 10 and 30 as discussed in conjunction with FIGS. 1 and 2. Further, RF IC 50 includes an auto calibrating RF transceiver 73 in accordance with the present invention, as will be discussed in greater detail in association with the description that follows, and particularly in conjunction with FIGS. 5-15.

Figure 4:
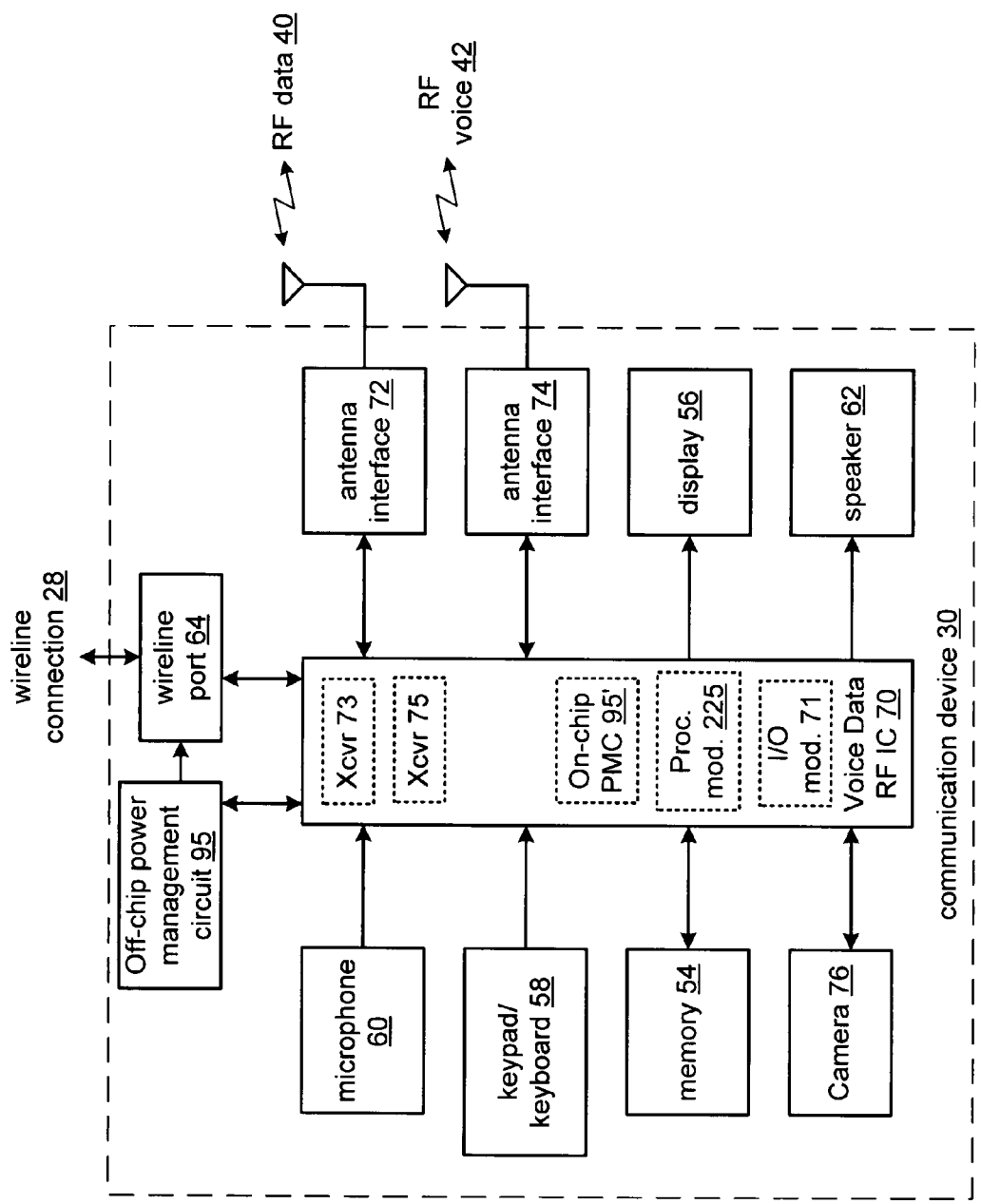
FIG. 4 is a schematic block diagram of a wireless communication device 30 in accordance with the present invention.

FIG. 4 is a schematic block diagram of another embodiment of an integrated circuit in accordance with the present invention. In particular, FIG. 4 presents a communication device 30 that includes many common elements of FIG. 3 that are referred to by common reference numerals. Voice data RF IC 70 is similar to voice data RF IC 50 and is capable of any of the applications, functions and features attributed to voice data RF IC 50 as discussed in conjunction with FIG. 3. However, voice data RF IC 70 includes two separate wireless 73 and 75 for communicating, contemporaneously, via two or more wireless communication protocols via RF data 40 and RF voice signals 42.

In operation, the voice data RF IC 70 executes operational instructions that implement one or more of the applications (real-time or non-real-time) attributed to communication device 10 as discussed in conjunction with FIG. 1. Further, RF IC 70 includes two auto calibrating RF transceivers 73 and 75 in accordance with the present invention, as will be discussed in greater detail in association with the description that follows, and particularly in conjunction with FIGS. 5-15.

Figure 5:
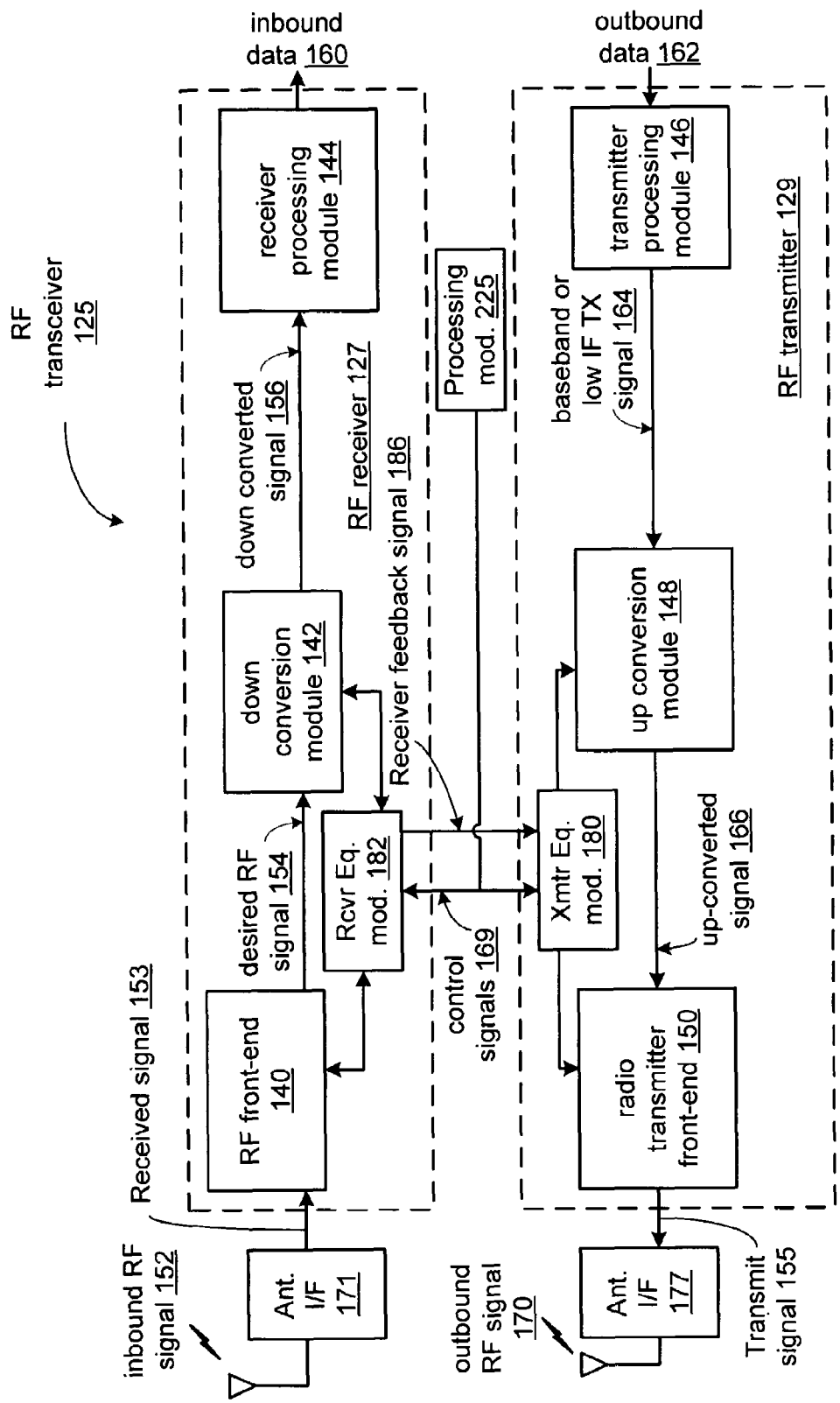
FIG. 5 is a schematic block diagram of an RF transceiver 125 in accordance with the present invention.

FIG. 5 is a schematic block diagram of an RF transceiver 125, such as transceiver 73 or 75, which may be incorporated in communication devices 10 and/or 30. The RF transceiver 125 includes an RF transmitter 129, and an RF receiver 127. The RF receiver 127 includes a RF front end 140, a down conversion module 142, a receiver equalization module 182 and a receiver processing module 144. The RF transmitter 129 includes a transmitter processing module 146, a digital up conversion module 148, a transmitter equalization module 180 and a radio transmitter front-end 150.

As shown, the receiver and transmitter are each coupled to respective antennas through off-chip antenna interfaces 171 and 177 to produce outbound RF signal 170 and to couple inbound signal 152 to produce received signal 153. While each antenna is represented as a single antenna element, the receiver and transmitter may each employ multiple antennas such as a phased array or other multi-antenna configuration, or share a multiple antenna structure that includes two or more antennas. In another embodiment, the receiver and transmitter may share a multiple input multiple output (MIMO) antenna structure that includes a plurality of antennas. Each of these antennas may be fixed, programmable, an antenna array or other antenna configuration. Also, the antenna structure of the wireless transceiver may depend on the particular standard(s) to which the wireless transceiver is compliant and the applications thereof.

In operation, the transmitter receives outbound data 162 from a host device or other source via the transmitter processing module 146. The transmitter processing module 146 processes the outbound data 162 in accordance with a selected wireless communication protocol (e.g., IEEE 802.11 or other wireless local area network (WLAN) protocol, Bluetooth, RFID, GSM, GPRS, EDGE, CDMA, et cetera) to produce processed data such as baseband or low intermediate frequency (IF) transmit (TX) signals 164 and generates a control signal 169 that indicates the selected one of the plurality of protocols. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 includes, but is not limited to, scrambling, encoding, puncturing, mapping, modulation, and/or digital baseband to IF conversion. Further note that the transmitter processing module 146 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 146 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up converted signals 166 based on a transmitter local oscillation 168.

The radio transmitter front end 150 includes a power amplifier and may also include a transmit filter module. The power amplifier amplifies the digital up converted signals 166 to produce outbound RF signals 170, which may be filtered by the transmitter filter module, if included. The antenna structure transmits the outbound RF signals 170 to a targeted device such as a RF tag, base station, an access point and/or another wireless communication device via an antenna interface 171 coupled to an antenna that provides impedance matching and optional bandpass or notch filtration. Radio transmitter front end 150 produces a transmit signal from the digital up-converted signal in accordance with the selected one of the plurality of protocols such as GSM, EDGE, CDMS, WLAN, GPRS, etc.

The receiver receives inbound RF signals 152 via the antenna and off-chip antenna interface 171 that operates to process the inbound RF signal 152 into received signal 153 for the receiver front-end 140. In general, antenna interface 171 provides impedance matching of antenna to the RF front-end 140 and optional bandpass filtration of the inbound RF signal 152.

The down conversion module 70 includes a mixing section, an analog to digital conversion (ADC) module, and may also include a filtering and/or gain module. The mixing section converts the desired RF signal 154 into a down converted signal 156 that is based on a receiver local oscillation 158, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce inbound data 160. The processing performed by the receiver processing module 144 includes, but is not limited to, digital intermediate frequency to baseband conversion, demodulation, demapping, depuncturing, decoding, and/or descrambling. Note that the receiver processing modules 144 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the receiver processing module 144 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The processing module 225 generates control signals 169 that command the RF receiver 127 and RF transmitter into a selected one of a plurality of modes including a receive calibration mode where the RF receiver 127 is calibrated based on a calibration signal from the transmitter 129 and a transmit calibration mode where the RF transmitter 129 is calibrated based on receiver feedback signals 186 received from RF receiver 127. In each of these modes the transmit signal 155 is received by the RF receiver 127, either through the respect transmit and receive antennas coupled to antenna interfaces 171 and 177 or through a separate attenuated coupling between the radio transmitter front-end 150 and the RF front-end 140 that is activated when the control signals 169 indicate that either a transmit calibration mode or a receive calibration mode has been selected.

In operation, processing module 225 generates control signals 169 that include a control signal that indicates a receive calibration mode. When in this receive calibration mode, RF transmitter 129 generates a transmit signal 155 that includes a first calibration signal. RF receiver 127 receives a received signal 153 that includes the first calibration signal and generates at least one receiver equalization parameter for equalizing the RF receiver in response to receiver feedback signals. In another mode of operation, control signal 169 can include a control signal that indicates a transmit calibration mode. During this transit calibration mode, RF transceiver 129 generates a second calibration signal and RF receiver 127 receives the received signal 153 that includes the second calibration signal and generates receiver feedback signals 186 in response thereto. RF transmitter 129 then generates at least one transmitter equalization parameter for equalizing the RF transmitter in response to the receiver feedback signals 186. In this fashion, a calibration signal from the RF transmitter 129 can be used to calibrate the RF receiver 127 and, once calibrated, receiver feedback signals 186 generated by the equalized/calibrated RF receiver 127 in response to a second calibration signal can be used to equalize (calibrate) the RF transmitter 129. Further details regarding the operation of receiver equalization module 182 and transmitter equalization module 180 are presented in conjunction with FIGS. 6 and 7 that follow.

FIG. 6 is a schematic block diagram of a transmitter equalization module 180 in accordance with an embodiment of the present invention. In particular, a transmit equalizer module 180 is shown that that includes a calibration signal generator 200 and a transmit equalizer module 210. In an embodiment of the present invention, in receive calibration mode, the calibration signal generator 200 generates calibration signals 202 such as modulated data signal having known data or other test sequence that is generated at RF frequencies and is passed to radio transmitter front-end 150 to produce transmit signal 155 or is generated at baseband or at IF frequencies and passed to up conversion module 148 to generate transmit signal 155 through radio transmitter front-end 150. This calibration signal generator 200 can be implemented with a signal generator that is separate from transmitter processing module 146 and/or up conversion module 148 (as shown) or using common or shared components of transmitter processing module 146 and/or up conversion module 148. In transmit calibration mode, the calibration signal generator 200 also generates calibration signals 202 such as modulated data signal having known data or other test sequence that is generated at RF frequencies and is passed to radio transmitter front-end 150 to produce transmit signal 155 or is generated at baseband or at IF frequencies and passed to up conversion module 148 to generate transmit signal 155 through radio transmitter front-end 150. These calibration signals may be the same as used in receive calibration mode or different depending on the type of equalization employed by the RF receiver 127 and RF transmitter 129, and other design considerations.

Transmit equalizer module 210 generates the at least one transmitter equalization parameter 212 in response to the receiver feedback signals. In an embodiment of the present invention, the RF receiver 127 uses mixed signal processing and the receiver feedback signals 186 indicate an in-phase gain and a quadrature-phase gain of the RF receiver 127. This information can be used by transmit equalizer module 210 to adjust an in-phase gain and/or a quadrature-phase gain of the RF transmitter 129 in the event that the RF transmitter uses mixed signal processing and/or produces phase coherent signaling. While the embodiment above describes two adjustments, a greater number of adjustments are possible to correct the magnitudes and phases of a greater number of transmitted signals in a constellation pattern to a preferred alignment.

In a further embodiment of the present invention, the receiver feedback signals 186 indicate a frequency response of the RF receiver 127 including the spectrum of the receive signal 153. This frequency spectrum information can be used to derive transmitter equalization parameters 212 that equalizes the frequency response of the RF transmitter 129. For instance, transmitter 129 can include a channel equalization filter such as an finite impulse response (FIR) filter or other filter having filter coefficients that are based on the transmitter equalization parameters 212. Similarly, the receiver feedback signals 186 can indicate an impulse response of the RF receiver 127 and the transmitter equalization parameters 212 can equalizes the impulse response of the RF transmitter 129.

Alternatively or in addition, the receiver feedback signals 186 can indicate a timing parameter of the RF receiver such as a bit time, a frame interval, a timing offset or other timing parameter, and the transmitter equalization parameters 212 can equalize the timing parameter of the RF transmitter 129 by adjusting the corresponding timing.

In an embodiment of the present invention, the transmit equalizer module 210 can be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the transmit equalizer module 210 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

FIG. 7 is a schematic block diagram of a receiver equalization module 184 in accordance with an embodiment of the present invention. In particular receiver equalization module 184 includes a feedback signal generator 220 and a receiver equalization module 224. Feedback signal generator 220 generates the feedback signals 186, such as in-phase and quadrate phase gains, frequency and/or impulse responses of the receiver, the spectrum or response of received signals, magnitude and phase errors in the one or more signals in a constellation pattern, timing errors, etc. based on an analysis of one or more parameters 220 of the RF receiver 127 and the various intermediate RF, IF and baseband signals produced thereby.

Receiver equalizer module 224 generates the at least one receiver equalization parameter 226 in response to the receiver feedback signals 184. In an embodiment of the present invention, the receiver feedback signals 186 indicate an in-phase gain and a quadrature-phase gain of the RF receiver 127. This information can be used by receive equalizer module 224 to adjust an in-phase gain and/or a quadrature-phase gain of the RF receiver 127. While the embodiment above describes two adjustments, a greater number of adjustments are possible to correct the magnitudes and phases of a greater number of transmitted signals in a constellation pattern to a preferred alignment.

In a further embodiment of the present invention, the receiver feedback signals 186 indicate a frequency response of the RF receiver 127 including the spectrum of the receive signal 153. This frequency spectrum information can be used to derive receiver equalization parameters 224 that equalizes the frequency response of the RF receiver 127. For instance, RF receiver 127 can include a channel equalization filter such as a finite impulse response (FIR) filter or other filter having filter coefficients that are based on the receiver equalization parameters 226. Similarly, the receiver feedback signals 186 can indicate an impulse response of the RF receiver 127 and the receiver equalization parameters 226 can equalize the impulse response of the RF receiver 127.

Alternatively or in addition, the receiver feedback signals 186 can indicate a timing parameter of the RF receiver such as a bit time, a frame interval, a timing offset or other timing parameter, and the receiver equalization parameters 226 can equalize the timing parameters of the RF receiver 127 by adjusting the corresponding timing.

In an embodiment of the present invention the feedback signal generator 220 and receiver equalizer module 224 can each be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the feedback signal generator 220 and receiver equalizer module 224 implement one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Figure 8:
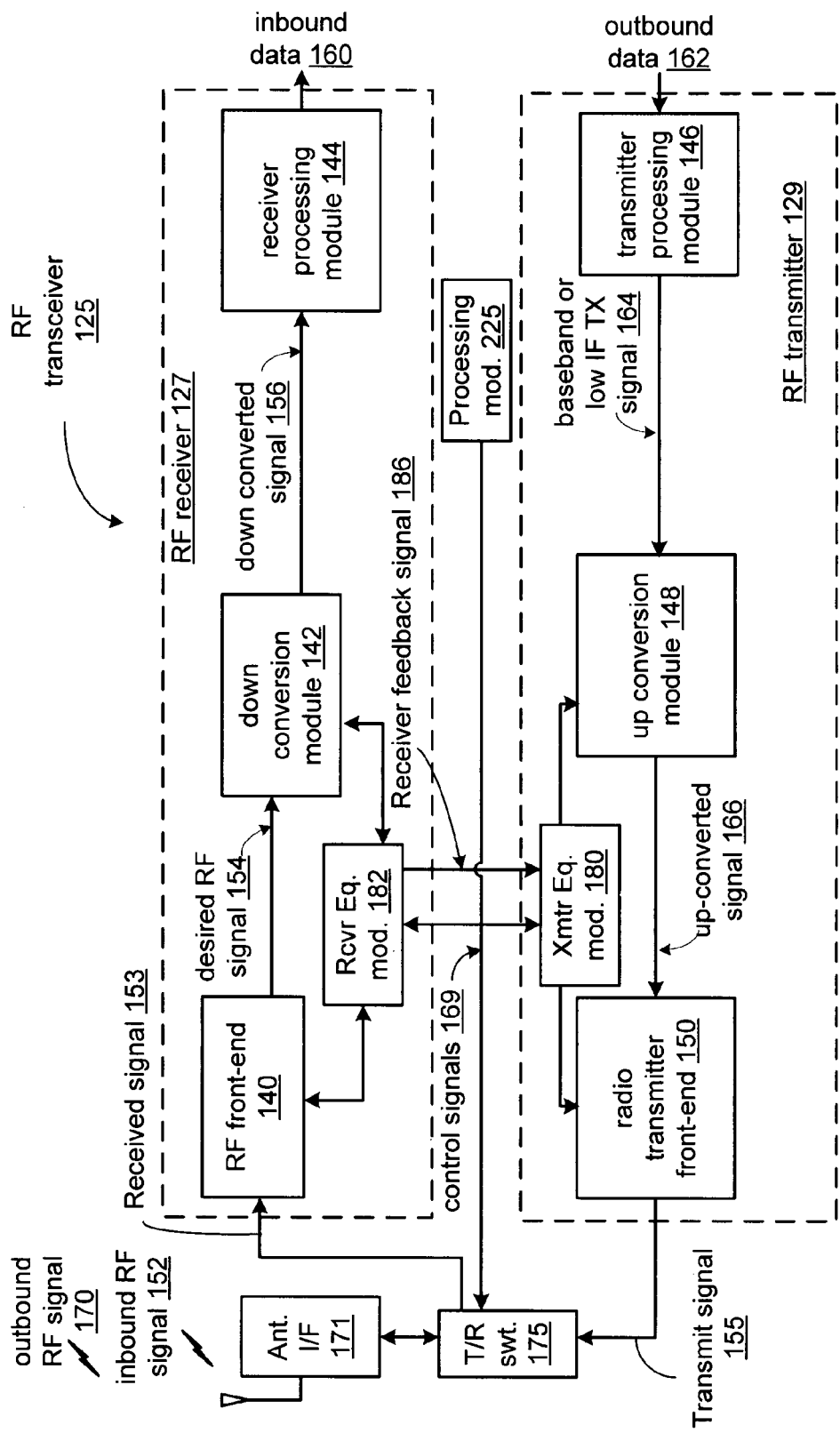
FIG. 8 is a schematic block diagram of an RF transceiver 125 in accordance with a further embodiment of the present invention.

FIG. 8 is a schematic block diagram of an RF transceiver 125 in accordance with a further embodiment of the present invention. This embodiment is similar to the embodiment presented in conjunction with FIG. 5 with similar elements being referred to by common reference numerals. In this embodiment however, RF receiver 127 and RF transmitter 129 share a single antenna and antenna interface 171. As shown, the receiver and transmitter are each coupled to an antenna through an off-chip antenna interface 171 and a transmit/receive switch 175, that couples the transmit signal 155 to the antenna to produce outbound RF signal 170 and couples inbound signal 152 to produce received signal 153. The transmit/receive switch 175 operates under the command of control signals 169 to couple an attenuated version of the transmit signal 155 as the received signal 153 when the control signals 169 indicate either a receiver calibration mode or a transmitter calibration mode. Further details regarding a possible implementation of transmit receive switch 175 is described in conjunction with FIGS. 9-11 that follow.

FIG. 9 is a schematic block diagram of a transmit/receive switch 175 in a transmit mode in accordance with a further embodiment of the present invention. In particular, in transmit mode, switch module 230 of transmit/receive switch 175 routes the transmit signal 155 to the antenna interface 171 to produce outbound RF signal 170.

FIG. 10 is a schematic block diagram of a transmit/receive switch 175 in a receive mode in accordance with a further embodiment of the present invention. In particular, in receive mode, switch module 230 of the transmit/receive switch 175 routes inbound RF signal 152 to the RF receiver 127 as received signal 153.

Figure 11:
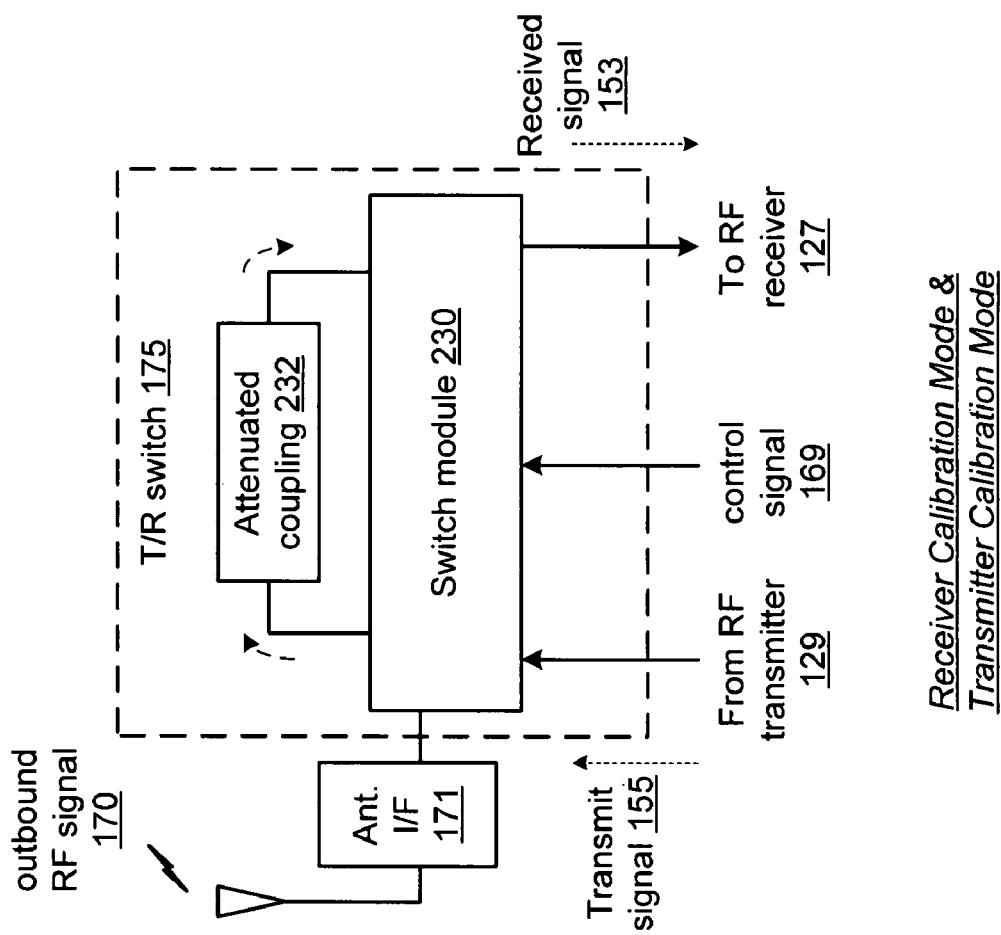
FIG. 11 is a schematic block diagram of a transmit/receive switch 175 in a receiver calibration mode and transmitter calibration mode in accordance with a further embodiment of the present invention.

FIG. 11 is a schematic block diagram of a transmit/receive switch 175 in a receiver calibration mode and transmitter calibration mode in accordance with a further embodiment of the present invention. In either the transmitter or receiver calibration mode, the transmit signal 155 is routed through the attenuated coupling 232 by the switch module 230 to produce a received signal 153 that is an attenuated version of the transmit signal 155. This allows the signal level of the received signal 153 to be attenuated to a signal level that avoids overloading the input of RF receiver 127.

Figure 12:
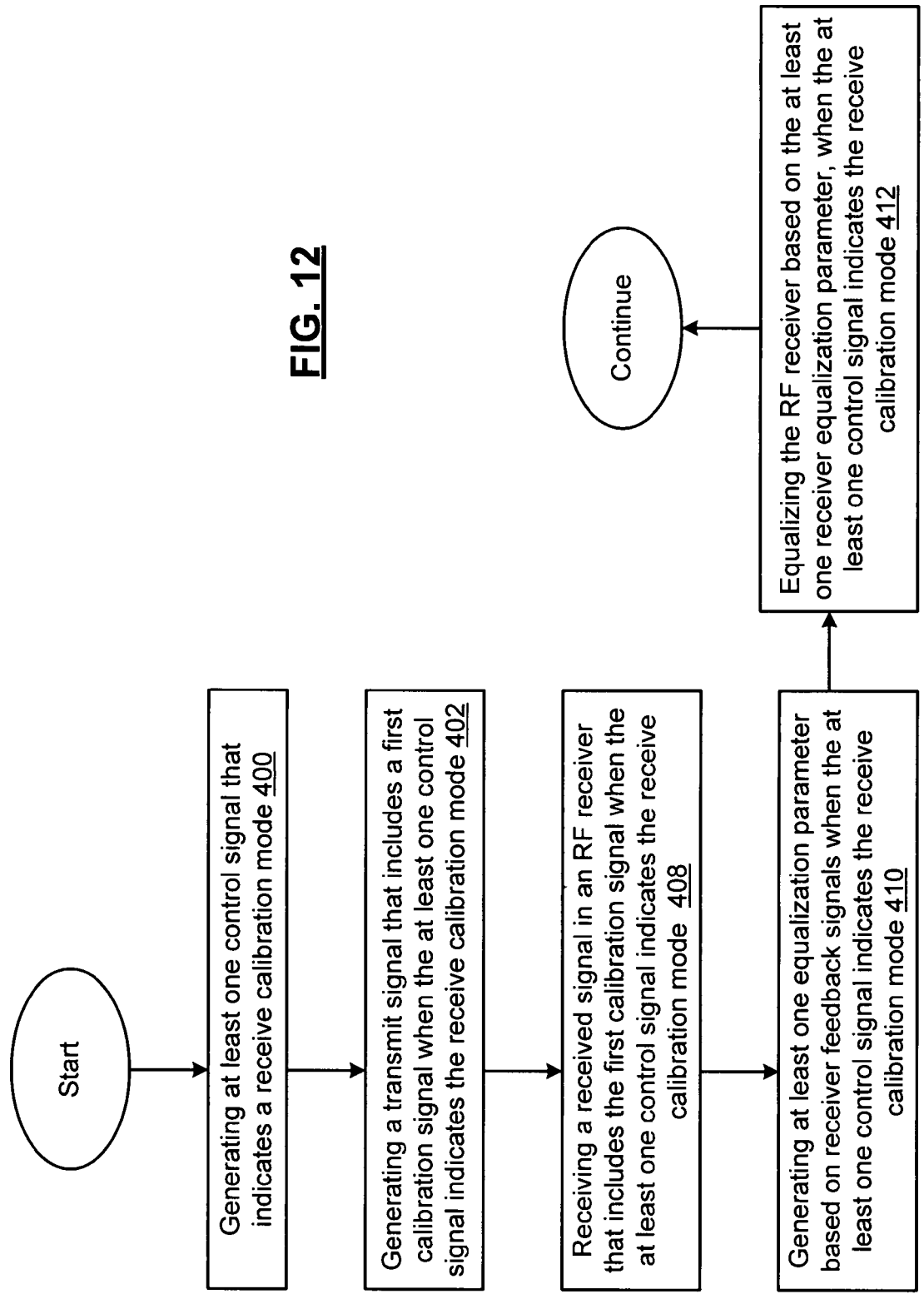
FIG. 12 is a flowchart representation of a method in accordance with an embodiment of the present invention.

FIG. 12 is a flowchart representation of a method in accordance with an embodiment of the present invention. In particular a method is presented for use with one or more features or functions presented in conjunction with FIGS. 1-11. In step 400, at least one control signal is generated that indicates a receive calibration mode. In step 402, a transmit signal is generated that includes a first calibration signal when the at least one control signal indicates the receive calibration mode. In step 408, a received signal is received in an RF receiver that includes the first calibration signal, when the at least one control signal indicates the receive calibration mode. In step 410, at least one receiver equalization parameter is generated based on receiver feedback signals, when the at least one control signal indicates the receive calibration mode. In step 412, the RF receiver is equalized based on the at least one receiver equalization parameter, when the at least one control signal indicates the receive calibration mode.

In an embodiment of the present invention, the receiver feedback signals indicate at least one of, an in-phase gain of the RF receiver, and a quadrature-phase gain of the RF receiver, and the at least one receiver equalization parameter can equalize at least one of the in-phase gain and the quadrature-phase gain. Also, the receiver feedback signals can indicate a frequency response of the RF receiver, and the at least one receiver equalization parameter can equalize the frequency response. Further, the receiver feedback signals can indicate an impulse response of the RF receiver, and the at least one receiver equalization parameter can equalize the impulse response. In addition, the receiver feedback signals indicate a timing parameter of the RF receiver, and the at least one receiver equalization parameter can equalize the timing parameter.

Figure 13:
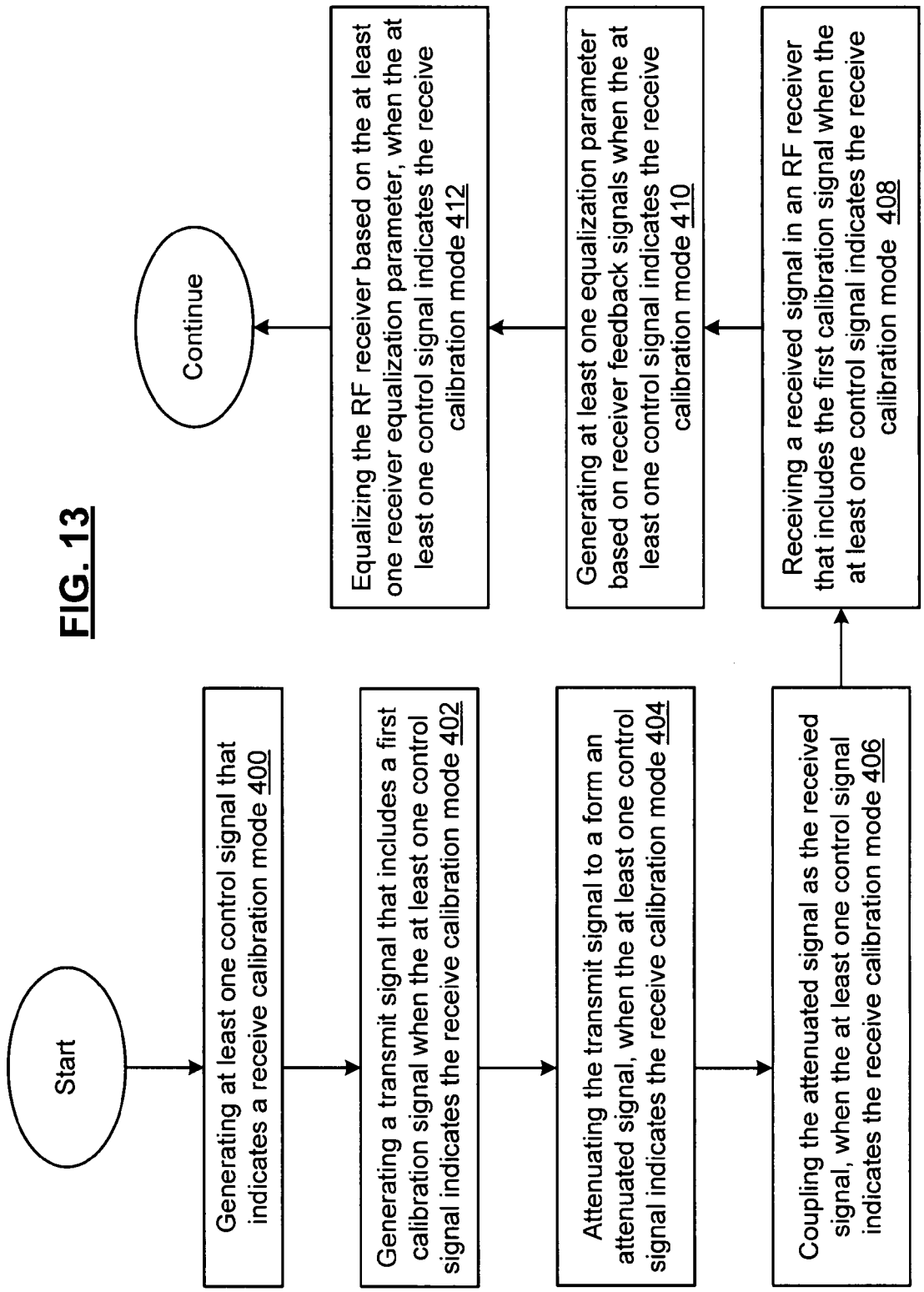
FIG. 13 is a flowchart representation of a method in accordance with an embodiment of the present invention.

FIG. 13 is a flowchart representation of a method in accordance with an embodiment of the present invention. In particular a method is presented for use with the method of FIG. 12 that includes similar elements that are referred to by common reference numerals. In addition, the method includes step 404 of attenuating the transmit signal to form an attenuated signal and step 406 of coupling the attenuated signal as the received signal when the at least one control signal indicates the receive calibration mode.

Figure 14:
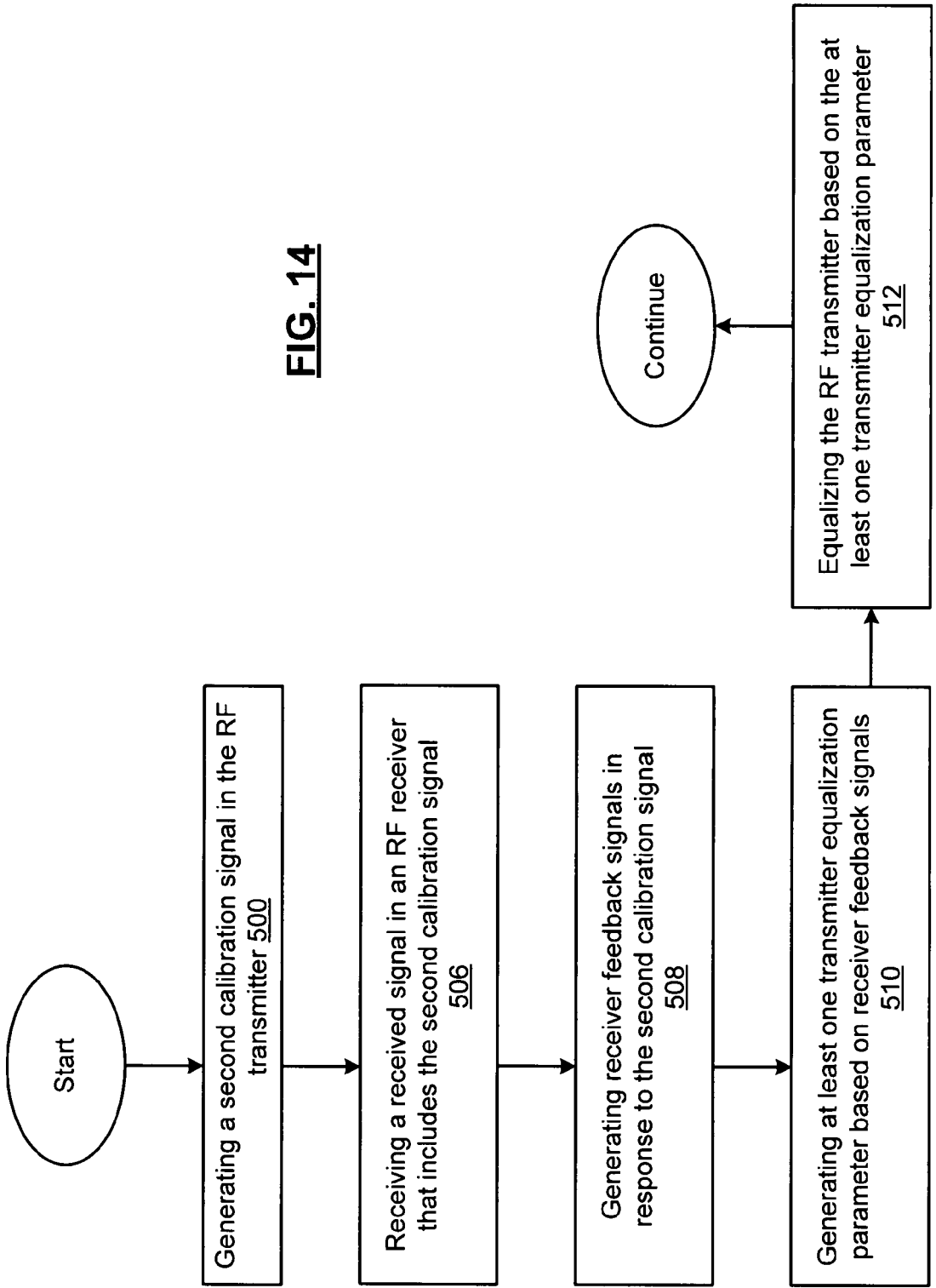
FIG. 14 is a flowchart representation of a method in accordance with an embodiment of the present invention.

FIG. 14 is a flowchart representation of a method in accordance with an embodiment of the present invention. In particular a method is presented for use with one or more features or functions presented in conjunction with FIGS. 1-13 when the control signal indicates the transmit calibration mode. In step 500 a second calibration signal is generated in an RF transmitter. In step 506, the received signal is received that includes the second calibration signal in the RF receiver. In step 508, receiver feedback signals are generated in response to the second calibration signal. In step 510 at least one transmitter equalization parameter is generated based on the receiver feedback signals. In step 512, the RF transmitter is equalized based on the at least one transmitter equalization parameter.

In an embodiment of the present invention the receiver feedback signals indicate at least one of, an in-phase gain of the RF receiver, and a quadrature-phase gain of the RF receiver, and the at least one transmitter equalization parameter equalizes at least one of an in-phase gain of the RF transmitter and a quadrature-phase gain of the RF transmitter. Also, the receiver feedback signals can indicate a frequency response of the RF receiver, and the at least one transmitter equalization parameter equalizes the frequency response of the RF transmitter. In addition, the receiver feedback signals can indicate an impulse response of the RF receiver, and the at least one transmitter equalization parameter equalizes the impulse response of the RF transmitter. Further, the receiver feedback signals can indicate a timing parameter of the RF receiver, and the at least one transmitter equalization parameter equalizes the timing parameter of the RF transmitter.

Figure 15:
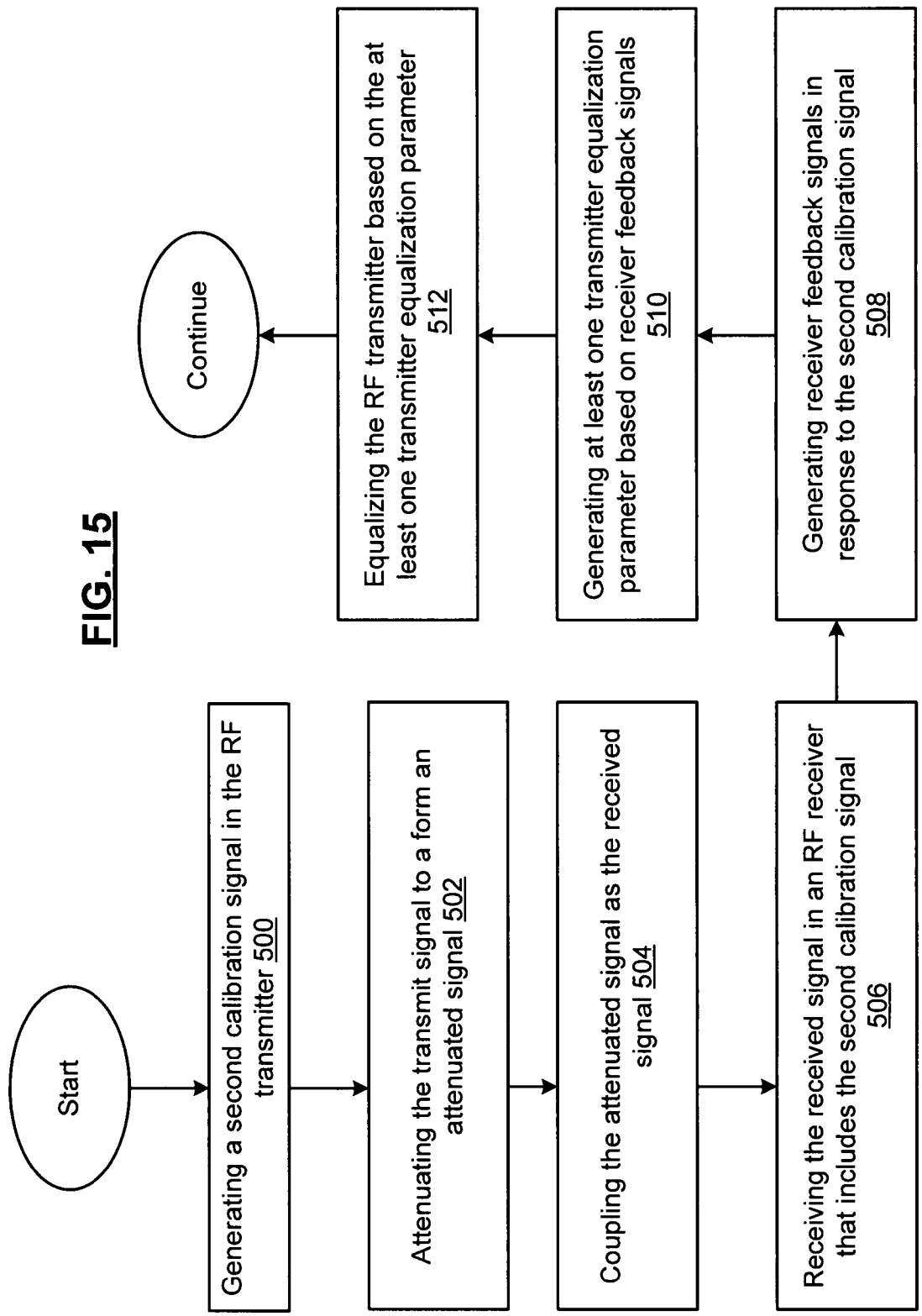
FIG. 15 is a flowchart representation of a method in accordance with an embodiment of the present invention.

FIG. 15 is a flowchart representation of a method in accordance with an embodiment of the present invention. In particular a method is presented for use with the method of FIG. 14 that includes similar elements that are referred to by common reference numerals. In addition, the method includes step 502 of attenuating the transmit signal to form an attenuated signal and step 504 of coupling the attenuated signal as the received signal when the at least one control signal indicates the transmit calibration mode.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors discussed above may be field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A voice, data and RF integrated circuit (IC) comprising:
    a processing module that generates at least one control signal that indicates a receive calibration mode;
    an RF transmitter, coupled to the processing module, that generates a transmit signal that includes a first calibration signal when the at least one control signal indicates the receive calibration mode; and
    an RF receiver, coupled to the processing module, that receives a received signal that includes the first calibration signal and that generates at least one receiver equalization parameter for equalizing the RF receiver in response to receiver feedback signals, when the at least one control signal indicates the receive calibration mode.

2. The voice, data and RF IC of claim 1 wherein the RF transmitter includes a transmitter equalization module having a calibration signal generator that generates the first calibration signal when the at least one control signal indicates the receive calibration mode.

3. The voice, data and RF IC of claim 1 wherein the RF receiver includes a receiver equalization module having a feedback signal generator that generates the receiver feedback signals in response to receiver parameters generated by the RF receiver and further having a receiver equalization module that generates the at least one receiver equalization parameter from the receiver feedback signals.

4. The voice, data and RF IC of claim 3 wherein the receiver feedback signals indicate at least one of, an in-phase gain of the RF receiver, and a quadrature-phase gain of the RF receiver, and wherein the at least one receiver equalization parameter equalizes at least one of the in-phase gain and the quadrature-phase gain.

5. The voice, data and RF IC of claim 3 wherein the receiver feedback signals indicate a frequency response of the RF receiver, and wherein the at least one receiver equalization parameter equalizes the frequency response.

6. The voice, data and RF IC of claim 3 wherein the receiver feedback signals indicate an impulse response of the RF receiver, and wherein the at least one receiver equalization parameter equalizes the impulse response.

7. The voice, data and RF IC of claim 3 wherein the receiver feedback signals indicate a timing parameter of the RF receiver, and wherein the at least one receiver equalization parameter equalizes the timing parameter.

8. The voice, data and RF IC of claim 1 wherein the at least one control signal indicates a transmit calibration mode, and when the at least one control signal indicates the transmit calibration mode, the RF transceiver generates a second calibration signal, the RF receiver receives the receiver signal that includes the second calibration signal and generates receiver feedback signals in response thereto, and the RF transmitter generates at least one transmitter equalization parameter for equalizing the RF transmitter in response to the receiver feedback signals.

9. The voice, data and RF IC of claim 8 wherein the RF transmitter includes a transmit equalizer module that generates the at least one transmitter equalization parameter in response to the receiver feedback signals.

10. The voice, data and RF IC of claim 9 wherein the receiver feedback signals indicate at least one of, an in-phase gain of the RF receiver, and a quadrature-phase gain of the RF receiver, and wherein the at least one transmitter equalization parameter equalizes at least one of an in-phase gain of the RF transmitter and a quadrature-phase gain of the RF transmitter.

11. The voice, data and RF IC of claim 9 wherein the receiver feedback signals indicate a frequency response of the RF receiver, and wherein the at least one transmitter equalization parameter equalizes the frequency response of the RF transmitter.

12. The voice, data and RF IC of claim 9 wherein the receiver feedback signals indicate an impulse response of the RF receiver, and wherein the at least one transmitter equalization parameter equalizes the impulse response of the RF transmitter.

13. The voice, data and RF IC of claim 9 wherein the receiver feedback signals indicate a timing parameter of the RF receiver, and wherein the at least one transmitter equalization parameter equalizes the timing parameter of the RF transmitter.

14. The voice, data and RF IC of claim 9 further comprising:
    an attenuated coupling, coupled to the RF transmitter and the RF receiver, that attenuates the transmit signal to form an attenuated signal and that couples the attenuated signal as the received signal when the at least one control signal indicates the transmit calibration mode.

15. The voice, data and RF IC of claim 1 further comprising:
    an attenuated coupling, coupled to the RF transmitter and the RF receiver, that attenuates the transmit signal to form an attenuated signal and that couples the attenuated signal as the received signal when the at least one control signal indicates the receive calibration mode.

16. A method comprising:
- generating at least one control signal that indicates a receive calibration mode;
- generating a transmit signal that includes a first calibration signal when the at least one control signal indicates the receive calibration mode;
- receiving a received signal in an RF receiver that includes the first calibration signal, when the at least one control signal indicates the receive calibration mode;
- generating at least one receiver equalization parameter based on receiver feedback signals, when the at least one control signal indicates the receive calibration mode; and
- equalizing the RF receiver based on the at least one receiver equalization parameter, when the at least one control signal indicates the receive calibration mode.

17. The method claim 16 wherein the receiver feedback signals indicate at least one of, an in-phase gain of the RF receiver, and a quadrature-phase gain of the RF receiver, and wherein the at least one receiver equalization parameter equalizes at least one of the in-phase gain and the quadrature-phase gain.

18. The method claim 16 wherein the receiver feedback signals indicate a frequency response of the RF receiver, and wherein the at least one receiver equalization parameter equalizes the frequency response.

19. The method claim 16 wherein the receiver feedback signals indicate an impulse response of the RF receiver, and wherein the at least one receiver equalization parameter equalizes the impulse response.

20. The method claim 16 wherein the receiver feedback signals indicate a timing parameter of the RF receiver, and wherein the at least one receiver equalization parameter equalizes the timing parameter.

21. The method of claim 16 further comprising:
- attenuating the transmit signal to form an attenuated signal; and
- coupling the attenuated signal as the received signal when the at least one control signal indicates the receive calibration mode.

22. The method claim 16 wherein the at least one control signal indicates a transmit calibration mode, the method further comprising;
- when the at least one control signal indicates the transmit calibration mode,
  - generating a second calibration signal in an RF transmitter;
  - receiving the received signal that includes the second calibration signal in the RF receiver;
  - generating receiver feedback signals in response to the second calibration signal;
  - generating at least one transmitter equalization parameter based on the receiver feedback signals; and
  - equalizing the RF transmitter based on the at least one transmitter equalization parameter.

23. The method of claim 22 wherein the receiver feedback signals indicate at least one of, an in-phase gain of the RF receiver, and a quadrature-phase gain of the RF receiver, and wherein the at least one transmitter equalization parameter equalizes at least one of an in-phase gain of the RF transmitter and a quadrature-phase gain of the RF transmitter.

24. The method of claim 22 wherein the receiver feedback signals indicate a frequency response of the RF receiver, and wherein the at least one transmitter equalization parameter equalizes the frequency response of the RF transmitter.

25. The method of claim 22 wherein the receiver feedback signals indicate an impulse response of the RF receiver, and wherein the at least one transmitter equalization parameter equalizes the impulse response of the RF transmitter.

26. The method of claim 22 wherein the receiver feedback signals indicate a timing parameter of the RF receiver, and wherein the at least one transmitter equalization parameter equalizes the timing parameter of the RF transmitter.

27. The method of claim 22 further comprising:
- attenuating the transmit signal to form an attenuated signal; and
- coupling the attenuated signal as the received signal when the at least one control signal indicates the transmit calibration mode.

* * * * *